April 1, 1958     K. SCHNEIDER     2,828,724

INTERNAL COMBUSTION ENGINES OF THE INJECTION TYPE

Filed Oct. 6, 1954

INVENTOR:
KARL SCHNEIDER
BY Wenderoth, Lind & Ponack
Attys.

United States Patent Office 2,828,724
Patented Apr. 1, 1958

2,828,724

INTERNAL COMBUSTION ENGINES OF THE INJECTION TYPE

Karl Schneider, Winterthur, Switzerland, assignor to Schweizerische Lokomotiv- und Maschinenfabrik, Winterthur, Switzerland Application October 6, 1954, Serial No. 460,649

Claims priority, application Switzerland October 8, 1953

2 Claims. (Cl. 123—32)

This invention relates to internal combustion engines of the injection type, in which the pistons are each provided with a combustion chamber formed as cavity of revolution, the axis of which chamber at least approximately coincides with the cylinder axis, and the opening of the chamber communicating with the cylinder space being constricted with respect to the combustion chamber. The charge of air compressed by the piston thus is displaced in vortices into the combustion chamber, and liquid fuel is injected into the chamber by a nozzle mounted in the cylinder head.

In known motors having a torus-like combustion chamber of this type, the fuel discharge bores in the nozzle are so disposed that the fuel jets may penetrate as deep as possible into the combustion chamber, so that the greater part of the atomized fuel particles are taken up by the simultaneously formed air vortices, before they impinge on the walls of the combustion chamber. The remainder of the fuel particles may possibly adhere to the walls of the combustion chamber without having been burnt, or the atomized particles may accumulate after having been reflected once or several times by the walls, and then they precisely do not mingle anymore at all with the air. These remainders of fuel thus burn partially only and as it is known, they contribute to a smoky combustion and to a soiling of the combustion chamber walls. This incomplete combustion particularly arises at reduced piston speed, i. e. at reduced number of revolutions of the motor, when the intensity of the vortex movement of the combustion air decreases and thus its intermixing with fuel is impaired.

It is an object of the present invention to avoid these drawbacks of faulty combustion, by making complete use of the phenomena of reflection of fuel jets at the combustion chamber walls. According to the invention, the combustion chamber is provided with an annular bottom face whose generatrix is at least approximately perpendicular to the axis of the cylinder, and with a joining side wall whose generatrix is at least approximatively parallel to the cylinder axis, the fuel discharge bores in the nozzle tip being so disposed that the core portions of the injected fuel jets impinge on said annular bottom face, then in a second phase the jets are reflected towards said side wall of the combustion chamber and from this latter in a third phase towards the combustion chamber opening.

A preferred embodiment of the invention and modifications thereof are represented in the accompanying drawing.

Figure 1:
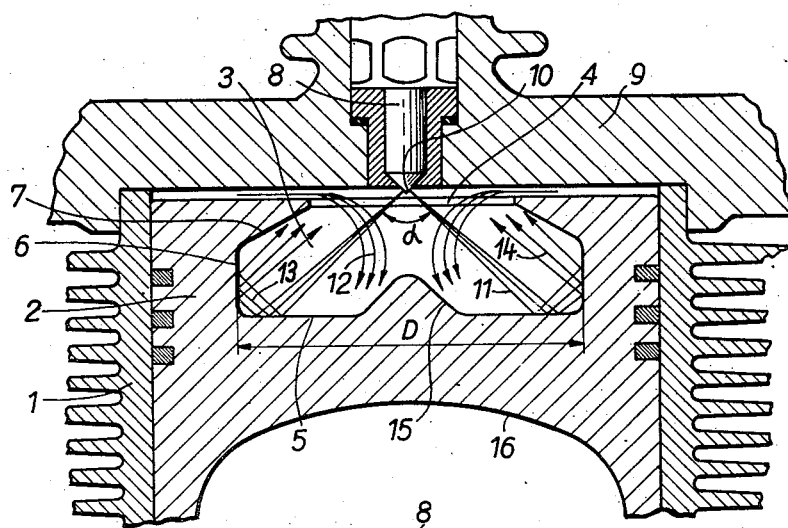
Fig. 1 is an axial section through the cylinder, piston and fuel injection nozzle of an internal combustion engine according to the invention.

In the drawings, the cylinder 1 of an air-cooled diesel engine provided with cooling ribs, contains a piston 2 supposed to be in the upper dead centre position. A combustion chamber 3 is disposed in the piston head. The chamber 3 is formed as a cavity of revolution whose axis coincides with the cylinder axis and whose opening 4 communicating with the cylinder space is constricted with respect to the diameter of the chamber. The bottom of the combustion chamber 3 is provided with an annular face 5 extending perpendicularly to the piston axis. A hollow cylindrical side face 6 joins the annular face 5 and is extended by a conical wall 7 to the opening 4 communicating with the cylinder space. The multiple bore fuel nozzle 8 is mounted in the cylinder head 9 and is coaxial with the cylinder 1. The fuel injection bores 10 are so disposed in the tip of the nozzle that the core portion of the fuel jets 11 leaving the bores are situated on a conical surface having a cone angle $\alpha$.

Upon normal operation of the motor, the charging air which is displaced into the combustion chamber with an intense vortex movement in the moment of the injection, entrains a great percentage of the fuel particles atomized by the injection nozzle, which are immediately burned. The not consumed fuel particles continue their movement and impinge on the annular bottom face 5 where, after further disintegration and in a second phase 13, they are reflected towards the side walls 6 of the combustion chamber and from the latter they are reflected in a third phase 14 towards the combustion chamber opening 4, inasmuch as they have not already been further consumed by the air vortices 12. Since the straight line generatrix of the side wall 6 is perpendicular to the bottom face 5, the fuel jets 14 of the third phase, according to the laws of reflection, are parallel to the corresponding fuel jets 11 of the first phase.

It is visible from the drawing that the jet cone 14 of the third phase is situated outside of the cone 11 of the first phase. Though the fuel jets of these two phases move in counter direction, they do not disturb nor cross each other. The jets of the third phase, after having been further atomized by the side wall 6 of the hollow cylinder having a diameter D, may thus still penetrate with great speed through the portion of the combustion chamber situated outside of the first jet cone 11. In this manner the combustion chamber space is filled uniformly and almost completely with fuel particles, which much favours the complete combustion.

This undisturbed penetration of the combustion chamber with atomized fuel particles is particularly favourable when the motor operates at reduced speed. In accordance with the correspondingly reduced piston speed the air vortices 12 entering into the combustion chamber 3 then are less intense, and a smaller percentage of particles is consumed already in the first phase 11. The particles not yet burnt are further atomized when impinging on and reflected from the faces 5 and 6 of the combustion chamber, so that even at reduced intensity of the air vortices 12 an effective intermixing of the particles with air and an unprejudiced combustion takes place. The motor accordingly may be fully charged within a quite extended range of number of revolutions of the motor, without starting to smoke when the number of revolutions decreases. The motor accordingly possesses a practically constant turning moment in a wide range of speed. This advantageous feature is particularly desirable in vehicle motors, since with only a slightly decreasing turning moment at decreasing number of revolutions, one must more rarely change to a lower gear, than with motor arrangements having a rapidly decreasing course of turning moment. The motor accordingly is very elastic.

The cone-shaped protuberances 15 in the centre of the combustion chamber bottom primarily serves to facilitate deviation of the combustion air stream 12 entering through the opening 4. Besides, since its summit is spaced from the internal face 16 of the piston, and therefore, owing to the fact that heat is carried off more slowly, it has a higher temperature than the adjacent portions of the piston, and favours ignition of the fuel, which is particularly advantageous during idling of the motor.

Figure 2:
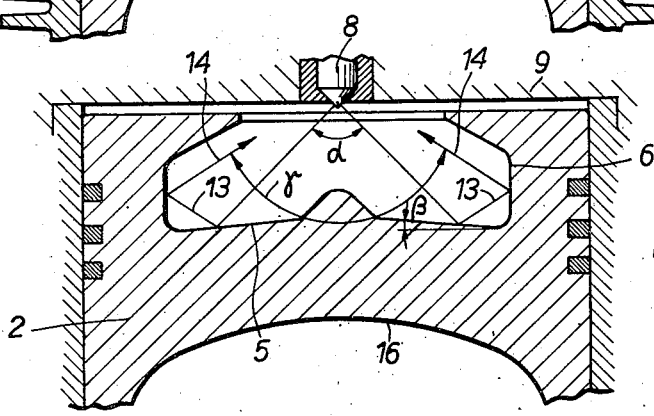
Figs. 2 and 3 are modifications of the combustion chamber arrangement.

In the modification represented in Fig. 2 the annular bottom part 5 of the combustion chamber is not flat, but inversely dished, i. e. slightly sloping towards the sidewall 6. This results in that the fuel jets reflected from the bottom face 5 and the side wall 6 are reflected to a greater extent according to the angle of inclination β and now do not leave parallel to the entering jets 11 but converge towards them (angle of cone γ).

Figure 3:
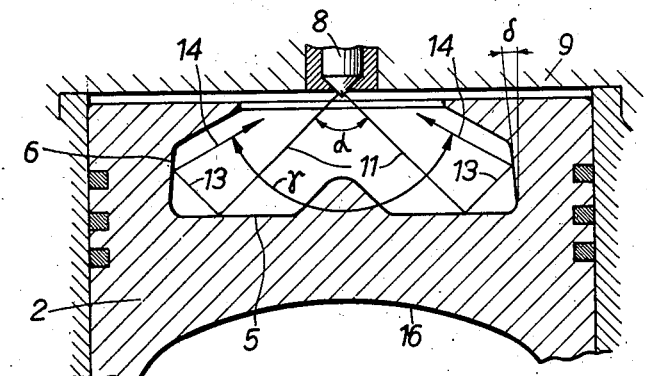

A similar deviation of the direction of the jets is obtained in the modification shown in Fig. 3, in which the bottom part 5 of the combustion chamber again is flat, the joining wall portion 6, however, is slightly conical instead of cylindrical. The generatrix of this hollow cone is inclined according to the angle δ with respect to the piston axis.

I claim:

1. An internal combustion engine of the injection type comprising power cylinders, a piston movable in each cylinder, each piston being provided with a circular combustion chamber, the axis of said chamber substantially coinciding with the cylinder axis and the opening of said chamber communicting with the piston space being constricted with respect to the diameter of the chamber whereby the charging air compressed by the piston is displaced into said chamber in a vortex movement, said combustion chamber having an annular bottom face, the generatrix of which extends substantially at right angles to the cylinder axis and a joining side wall the generatrix of which includes an angle deviating from 90° with the generatrix of said bottom face, the generatrix of said bottom face and the generatrix of said side wall both being straight, a cylinder head, a fuel injection nozzle in said cylinder head in substantial alignment with the axis of said combustion chamber said nozzle being provided with fuel discharge bores adapted to direct the discharged fuel jets in the form of a cone towards said annular bottom face to impinge thereon, said cone having an apex angle of substantially 90° and having its axis coinciding with the axis of said combustion chamber.

2. An internal combustion engine comprising a cylinder and a piston movable therein a cylinder head, a fuel injection nozzle mounted in said head in substantial alignment with the cylinder axis, the piston top being provided with a circular combustion chamber having its axis substantially coinciding with the cylinder axis, said combustion chamber having a bottom face whose major portion is formed by a plane annular surface extending transversely to the cylinder axis, an upstanding side wall joining said bottom face, and a constricted opening communicating with the cylinder space said bottom face being provided in its center with a protuberance, said injection nozzle having fuel discharged openings adapted to direct the fuel jets discharged from the nozzle substantially in the form of a cone surface towards said bottom face to impinge thereon outside of said protuberance.

References Cited in the file of this patent

UNITED STATES PATENTS

| 1,633,541 | Braren | June 21, 1927 |
| 2,644,433 | Anderson | July 7, 1953 |

FOREIGN PATENTS

| 498,699 | Germany | May 26, 1930 |
| 414,082 | Italy | June 27, 1946 |
| 473,733 | Italy | Aug. 9, 1952 |
| 585,801 | Great Britain | Feb. 25, 1947 |
| 253,567 | Switzerland | Nov. 16, 1948 |